Oct. 10, 1967  R. G. LEE  3,345,911
PAPER TRANSPORT
Filed Sept. 22, 1964  5 Sheets-Sheet 1
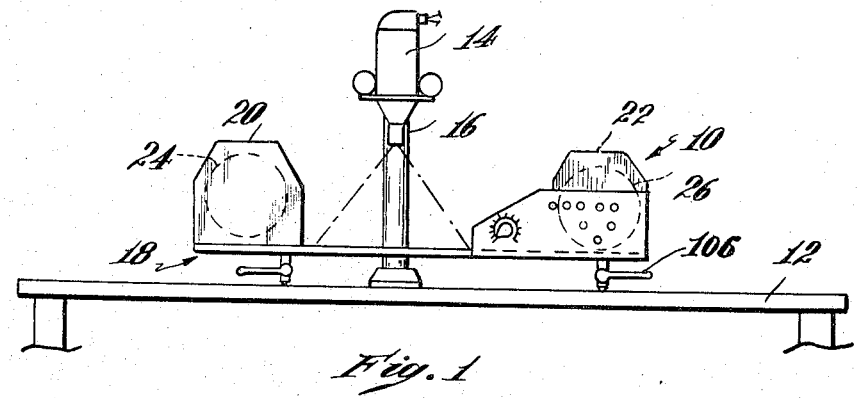
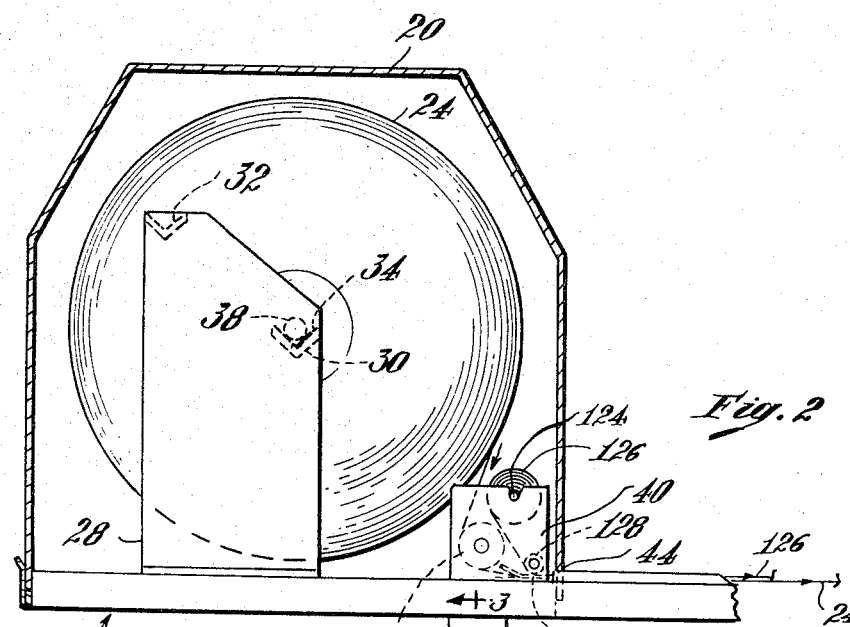
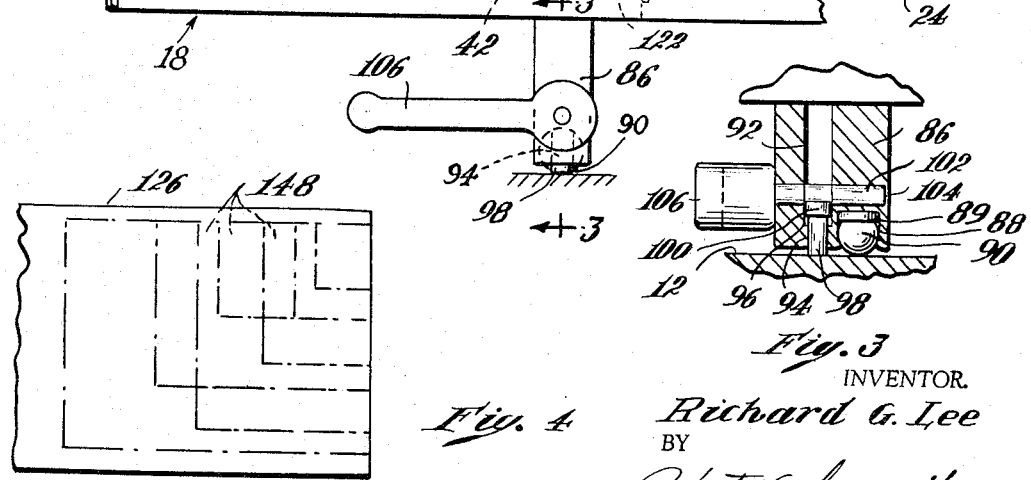
INVENTOR.
Richard G. Lee
BY
Roberts, Cushman & Grover
ATT'YS

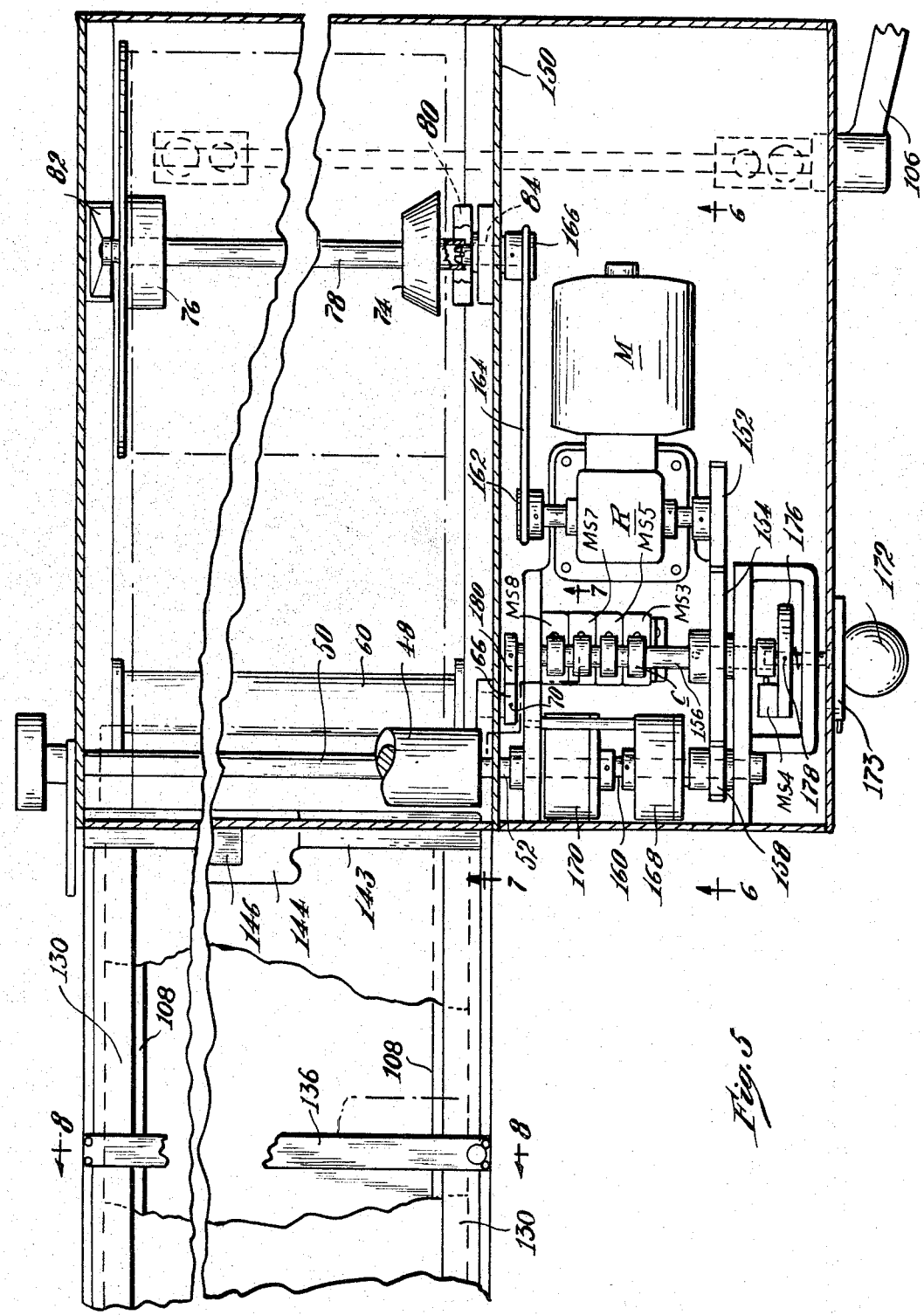

Oct. 10, 1967   R. G. LEE   3,345,911
PAPER TRANSPORT
Filed Sept. 22, 1964   5 Sheets-Sheet 3

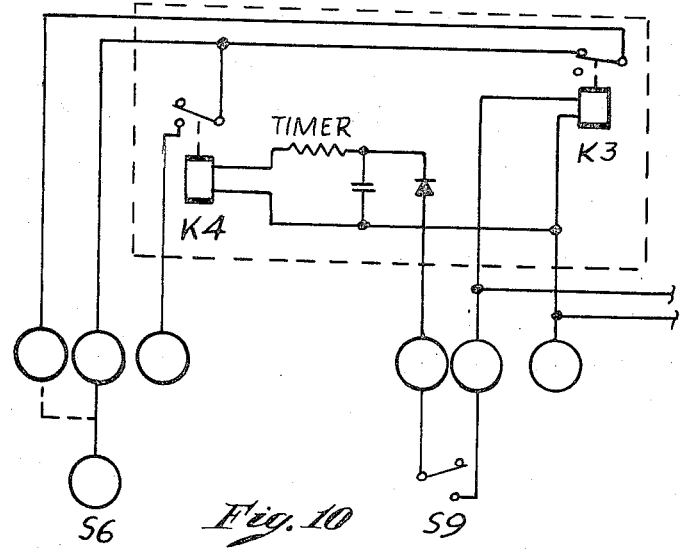
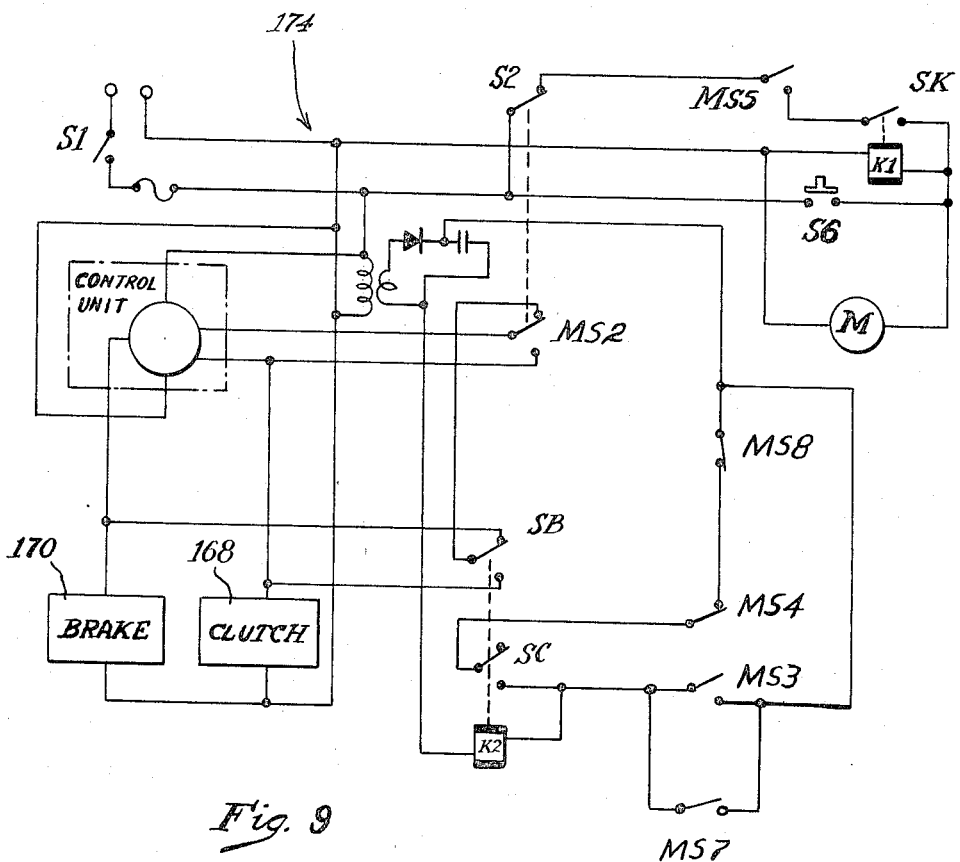

United States Patent Office 3,345,911
Patented Oct. 10, 1967

3,345,911
PAPER TRANSPORT
Richard G. Lee, Weston, Mass., assignor, by mesne assignments, to Alves Photo Service, Inc., Braintree, Mass., a corporation of Massachusetts
Filed Sept. 22, 1964, Ser. No. 398,246
27 Claims. (Cl. 88—24)

This invention relates to a paper transport and has for its principal objects to provide a device movable relative to an enlarger for supporting a photosensitive paper in strip form for disposition of successive lengths in the focal plane of the enlarger; to provide a device in which the length of the paper to be exposed is shielded from light during focusing; to provide a device in which focusing is obtained relative to a plane parallel to the concealed paper; to provide a device in which the paper is automatically moved into the focal plane of the enlarger by immobilization relative to the enlarger; to provide a device in which the means for concealing the paper is variably adjustable to expose different lengths of paper; to provide a device of the foregoing kind with an improved control whereby uniform lengths of paper may be drawn off for each cycle of operation; to provide adjusting means for changing the length drawn off for any given cycle of operation; to provide a device in which the exposed paper may be stored up in strip form for subsequent processing or cut up into lengths; and to provide a device which is of simple construction and easy to maintain and operate.

As herein illustrated, the transport comprises a mobile base and a housing at each end of the base providing a flat supporting surface therebetween adapted to be placed in the focal plane of an enlarger. One of the housings contains means for supporting a roll of photosensitive paper and the other means for taking up the exposed paper. There is means movable between the housings parallel to the supporting surface to conceal the entire area of the paper resting thereon until an exposure is to be made. This latter means is movable variable amounts to expose different lengths of paper. Paper guides are positioned lengthwise of the supporting surface for guiding the paper lengthwise thereof. One of the guides is adjustable widthwise of the supporting surface for papers of different width. The means for concealing the paper between the housings is a spring-retractable curtain and there are guides for maintaining a light-tight relation between the edges of the curtain and the supporting surface so as to exclude light from the paper. A magnet is secured to the leading end of the curtain and provides means for holding it extended during focusing. The surface of the curtain is provided for focusing with indicia representing different size prints. An adjustable gauge bar, situated between the housings transversely of the supporting surface, limits retraction of the curtain to the selected size when released. The base is mounted on rollers for movement relative to the enlarger and there are adjustable feet for raising it from the rollers to immobilize the device relative to the enlarger and automatically to raise the plane of the paper resting on the supporting surface to the plane of the upper surface of the curtain and hence into the focal plane of the enlarger. The paper is advanced cyclically by manual depression of a switch in a control circuit, the latter being designed to draw off, by means of feed rolls, successive equal lengths of paper until adjusted for a different length. Adjustment is obtained by engaging a clutch with the drive shaft of one of the feed rolls at the beginning of any cycle and disengaging it at different intervals following initiation of the cycle. The paper, following exposure, may be stored in the housing in strip form on a roll, provided for this purpose, disposed rearwardly of the feed rolls which is driven through a slip connection to take up the paper without pulling relative to the feed rolls, or optionally an anvil and cutter disposed in the housing are operative to cut the strip into successive lengths.

The invention will now be described in greater detail with reference to the accompanying drawings wherein:

FIG. 1 is an elevation of the apparatus resting on a support showing its relation to an enlarger;

FIG. 2 is a vertical section, to much larger scale, showing the paper support and light-tight housing therefor;

FIG. 3 is a fragmentary section, to still larger scale, taken on the line 3—3 of FIG. 2;

FIG. 4 is a fragmentary plan view of the light-tight curtain which covers the photosensitive paper between the housings, showing the marked areas for various size prints to enable focusing;

FIG. 5 is a horizontal section, broken away in part, showing the housing containing the take-up roll and the drive means;

FIG. 9 is a diagram of the control for the apparatus;

FIG. 10 is a wiring diagram for cycling operation of the apparatus each time the enlarger lamp is turned on;

Figure 11:
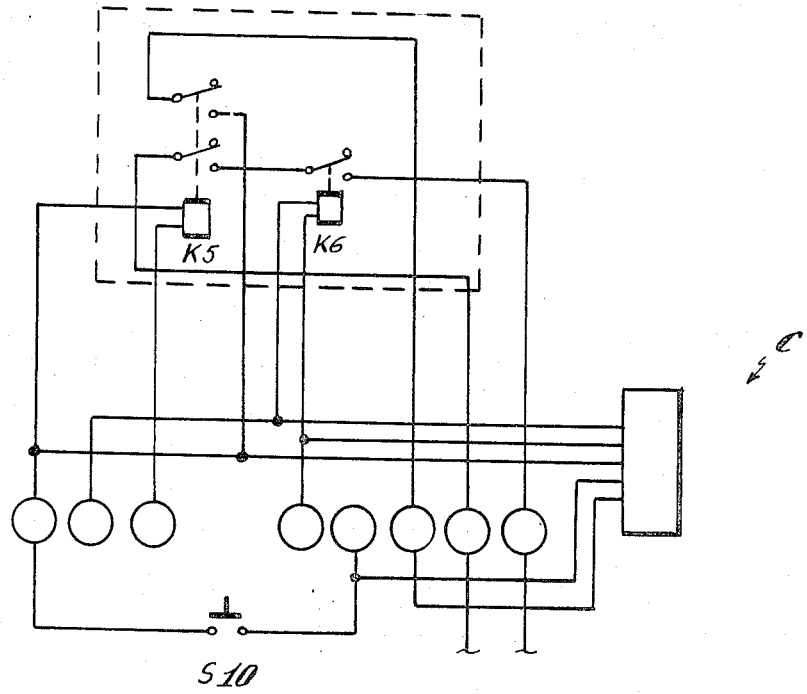
Figure 12:
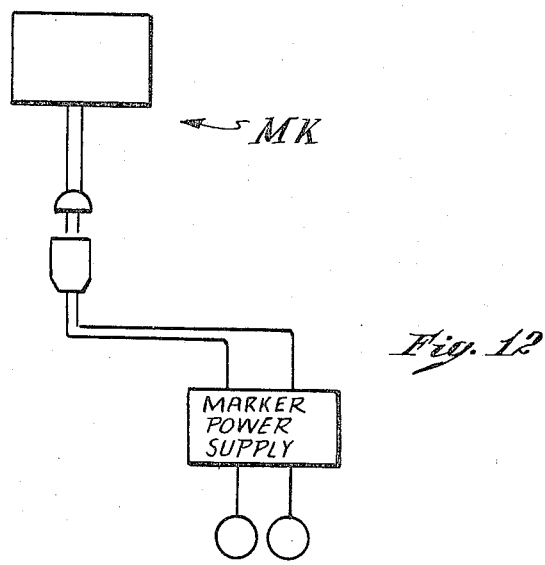

FIG. 11 diagrammatically illustrates a counter and circuit therefor for making a predetermined number of identical prints; and FIG. 12 diagrammatically illustrates a marker and circuit therefor.

Referring to FIG. 1, the apparatus 10 is supported by a table 12 or an equivalent rigid structure for movement on the surface thereof relative to an enlarger 14, the latter being supported on a post 16 fixed to the table, to bring an area of a sensitized photographic paper into the focal plane of the enlarger. The apparatus comprises a rigid base 18, to the opposite ends of which are fixed light-tight housings 20 and 22, one of which is adapted to contain a roll of sensitive paper 24 and the other of which is adapted to take up the exposed paper in a roll 26.

The light-tight housing 20 contains transversely spaced, vertically disposed plates 28—28, to the adjacent sides of which are fixed short sections of angle 30—30 and 32—32. The angle sections provide V-shaped notches 34—34 and 36—36. Each pair of angle sections 30 and 32 provide bearings for supporting a shaft 38 in a horizontal position for unwinding of a roll of sensitized paper therefrom. A pair of spaced, vertically disposed plates 40—40 are mounted in the housing forwardly of the plates 28—28 and a guide roll 42 is journaled between these plates and provides for guiding the sensitive paper from the roll around its underside and through a slot 44 in the forward wall of the housing 20, substantially parallel to the base 18, across which it is led to the housing 22 for taking up after exposure. The housing 22 has in its rear side, that is, the side opposite the forward side of the housing 20, a slot 46 (FIG. 7) through which the paper is adapted to pass into the housing between a pair of feed rolls 48 and 50 mounted, respectively, on shafts 52 and 54, by means of which the paper is drawn into the housing. The shaft 54 is mounted at the distal ends of arms 53 pivotally supported at 51. Springs 57 yieldably support the arms so that the roll 50 bears against the underside of the roll 48. The yieldable mounting of the roll 50 provides for papers of different thickness and for lowering the roll 50 to enable squaring the paper with respect to its direction of movement. If desired, the paper may be cut into prints without rewinding and, to this end, an anvil 58 (FIG. 7), containing a slot 56 transversely thereof, is mounted forwardly of the rolls 48 and 50 so that the paper passes through it. Forwardly of the anvil a segmental cutter 60 is fixed to a shaft 62 journaled at its ends in the wall of the housing. The cutter is operable, by rotation of the shaft 62, to cause its cutting edge 64 to engage the forward side of the anvil 58 tangentially at the line where the paper emerges from the slot 56. An arm 66 is fastened to the shaft 62 by a set screw 68 and normally holds the cutter in an inoperative position by way of a pin 70 fixed to its upper end and a spring 72 connected at one end to the pin 70 and at its other end to a part of the housing. If the cutter is not employed, the paper merely passes through the slot 56 and onto a take-up roll constituted by hubs 74 and 76 (FIG. 5) fixed to a spindle 78. The ends of the spindle 78 are journaled in bearings 80 and 82 and one end is engageable with a drive shaft 84 for rotation.

The photosensitive paper is drawn out of the housing 20 across the base 18 into the housing 22 and the portion intermediate the two housings lies flat on the base beneath the enlarger. To enable adjustable of the exposed portion of the sensitized paper, the apparatus is made mobile by providing three legs 86 (FIGS. 1 to 3) which project vertically downward from the underside of the base. Each of the legs 86 (FIG. 3) contains in its lower end a socket opening 88 within which is mounted a thrust bearing 89 and a ball 90, so that normally the apparatus may be pushed along the surface of the support 12 into a proper position with relation to the enlarger. When the area to be exposed is properly positioned, the apparatus must be immobilized. Accordingly, each leg has a vertically disposed hole 92 which extends through the lower end. The lower part 94 of the hole is of smaller area than the upper part, providing thereby a shoulder 96, and a headed pin 98 is disposed in the hole with its head 100 above the shoulder and its shank in the part 94 of smaller area. Each leg also has a horizontal hole 102 in which there is mounted a cam rod 104, one end of which has secured to it a lever 106, by means of which the rod may be rotated. The cam rod 104 has contact with the head 100 of the pin 98 and, by rotation, may be projected from the lower end of the leg to raise the leg off of the ball 90. By raising each of the legs off of the ball support, the apparatus is rendered immobile so that manipulation for effecting exposure can be carried out without danger of movement of the apparatus out of position.

The base 18 has along its opposite edges between the two housings paper guides 108—108 (FIGS. 5 and 8), which have at their inner edges undercut flanges 110—110. One of these guides is fixed and the other is adjustable transversely of the base toward the other. The adjustable guide is adjustably secured to the base by a pair of bolts 112—112, at its opposite ends, which pass through slots 114—114 transverse to the base. Each of the bolts 112 has on it a washer 116 which is engaged with the underside of the base, a coil spring 118 disposed about its shank, and a nut 120, thus providing for yieldably holding the guide in position but permitting shifting the guide transversely of the base according to the width of the paper which is being used.

The sensitized paper is led through the slot 44 beneath the flanges 110—110 by pairs of steel guide strips 122—122 (FIG. 2) situated adjacent the guide roll 42. One of the guide strips 122 is adjustable transversely of the slot 44.

Figure 8:
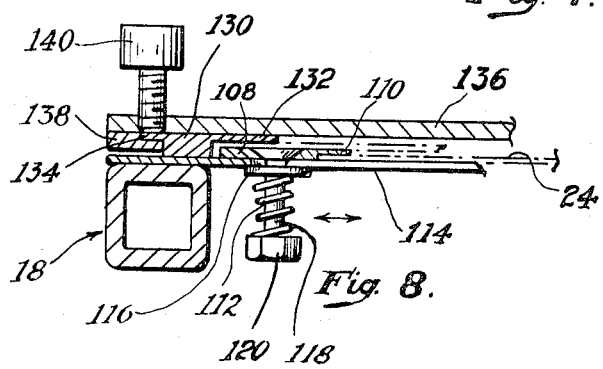
FIG. 8 is a fragmentary section taken on the line 8—8 of FIG. 5.

The sensitive paper must be covered prior to exposure when it is drawn from the housing 20 across the base to the housing 22, while the operator is focusing the enlarger on the area which is to be exposed. To this end a hole (not shown) and slot 124 are formed in the upper portions of the plates 40—40 (FIG. 2) and a roller curtain 126 of light-tight material is rotatably mounted therein in the same fashion as a conventional window curtain, so that it may be drawn downwardly under a roller 128 adjacent the slot 44, through the slot 44 in parallel relation to the paper 24 and across the base between the housings 20 and 22. The edges of the curtain are maintained in light-tight relation to the base by spaced parallel guides 130—130 mounted at the opposite edges of the base, the inner edges of which have undercut flanges 132—132 adapted to overlie the edges of the curtain. Each of the guides 130 has an undercut, outwardly projecting flange 134 (FIG. 8). A bar 136, having guide blocks 138—138 secured to its opposite ends, is slidably mounted on the guides 130—130 so that it may be moved lengthwise of the support between the two housings. Screws 140, threaded through the ends of the bar 136, provide for securing the bar at any desired position. The leading end of the curtain has fixed to it a rigid bar 143 and a handle 144 (FIG. 5), by means of which the curtain may be pulled forwardly from the housing 20 to a position to engage the bar 143 with the housing 22. The handle 144 is recessed to receive a magnet 146 which is of sufficient strength, when brought into proximity with the housing 22, to hold the curtain extended in opposition to a spring which normally would rewind the curtain if released. As thus constructed, the curtain is drawn across the support from the housing 20 to the housing 22 as the preliminary step in the operation and is held by the magnet in its extended position.

To enable selection and focusing of the proper area for the size exposure to be made, the upper surface of the curtain 126 (FIG. 4) has marked on it, by suitable means, guide lines 148 representing different size exposures. The apparatus is adjusted on the ball supports 90 to bring the surface of the curtain into the focal plane of the enlarger over the area desired whereupon the levers 106 are manipulated to immobilize the apparatus in this position. The projection of the pins 98 from the lower ends of the legs to raise the base off of the ball support is just enough to move the paper into the plane of focus of the enlarger. The adjustable paper guide 108 will, of course, have already been adjusted according to the width of the paper mounted in the housing 20. The length of paper exposed is controlled by the position of the bar 136, lengthwise of the support, by engagement of the bar 143 therewith when the curtain is released. It is thus possible to make the preliminary preparation for exposure in an undarkened room, both as to focusing and area, so that all that remains is to darken the room, release the curtain and make the exposure. Following exposure the curtain may immediately be restored to its covering position, the exposed sensitized paper drawn into the housing 22 and cut or rolled up, and a new length brought into position preparatory to the next operation.

The housing 22 is divided lengthwise by a partition 150 (FIG. 5) to provide space for a motor M, by means of which the drive rolls and take-up roll are driven in such fashion as to draw off predetermined lengths of the sensitive paper. The motor M drives a gear reducer R which, in turn, by means of a gear 152, drives a gear 154 fixed to a cam shaft 156. The gear 154, in turn, drives a gear 158 which is free to rotate on a shaft 160. The shaft 160 is an extension of the shaft 52. The gear reducer R also drives a pulley 162, about which one end of a belt 164 is entrained, the other end being entrained about a pulley 166 secured to the shaft 84. A clutch and brake assembly, consisting of a clutch element 168 and a brake element 170, are rotatably mounted on the shaft 160 and are operable, as will be described hereinafter, to drive the shaft 160 or to prevent its rotation.

Figure 6:
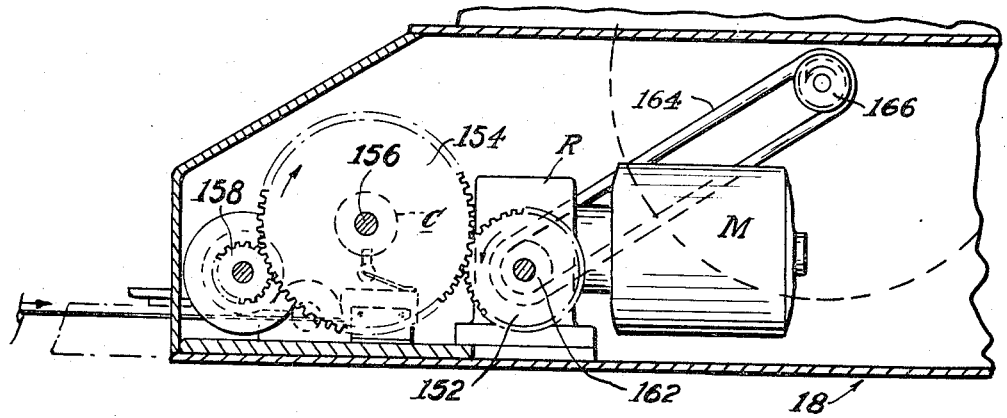
FIG. 6 is an elevation, partly in section, taken on the line 6—6 of FIG. 5.
Figure 7:
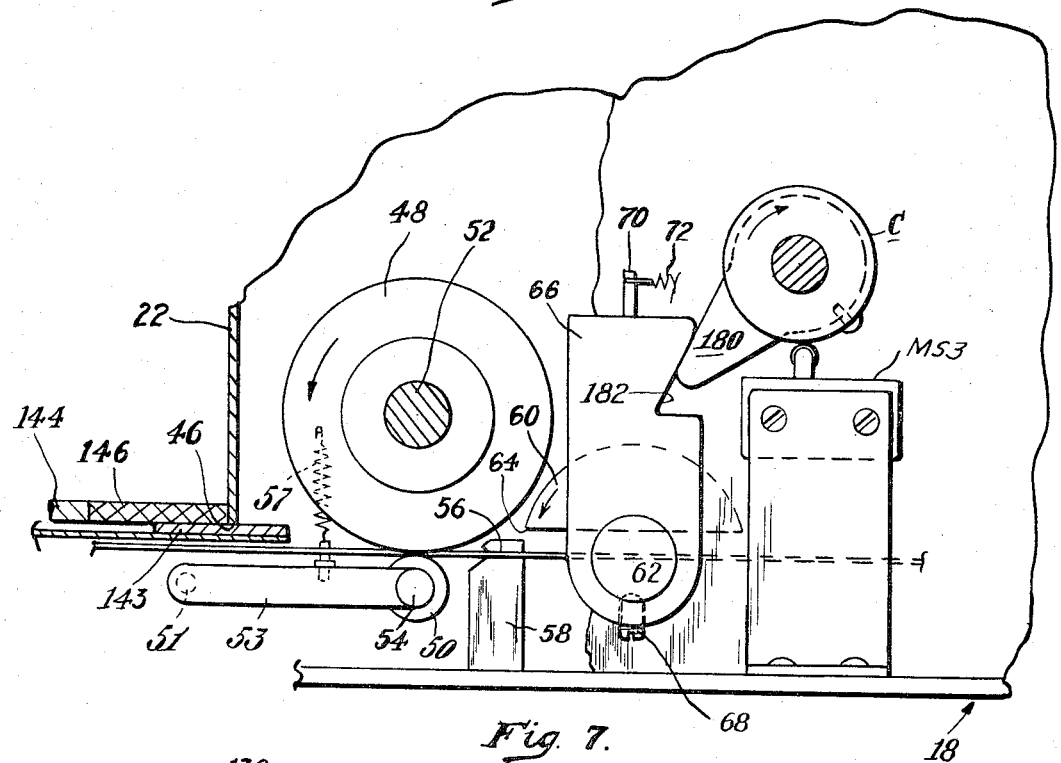
FIG. 7 is a section taken on the line 7—7 of FIG. 5, to very much larger scale.

As shown in FIGS. 5 to 7, the cam shaft 156 has a number of cams c thereon which operate microswitches MS3 to MS8 inclusive, supported adjacent the cam shaft.

The apparatus is designed to withdraw predetermined lengths of paper successively by setting an adjusting knob 172 (FIG. 5) relative to a graduated plate 173. Having set the knob for a predetermined length, the machine will continue to draw off successive equal lengths each cycle of operation until a readjustment is made. The machine operates only one cycle at a time.

Referring to the control circuit 174 of FIG. 9 there is a switch S1 which may be closed to supply power thereto. To initiate a cycle of operation a push button switch S6 is momentarily closed—such closing operating to energize a relay K1 which, in turn, closes a switch SK for maintaining a closed circuit through the motor M after the push button switch S6 is released. As soon as the motor commences to rotate, it effects rotation of the cam shaft 156 by way of the gears 152 and 154 previously referred to. The cam shaft has cams on it operative, as the cam shaft is rotated, to actuate the microswitches supported adjacent the cam shaft. The first microswitch to be actuated is microswitch MS3. When this microswitch is closed, relay K2 is energized so as mechanically to change the position of the switch SB and holding contact SC simultaneously. Changing the position of switch SB releases the brake 170 from the shaft 160 and engages the clutch 168 with the shaft 160, the brake and clutch being shown in the diagram as blocks, and being suitably connected to a control unit labeled as such which enables simultaneous operation of the brake and clutch as desired. Engagement of the clutch with the shaft 160 effects its rotation and such rotation will continue until microswitch MS4 is opened by a cam on the cam shaft. Opening of the microswitch MS4 breaks the circuit through the relay K2, so that the switches SB and SC are returned to their original position thus dsengaging the clutch and applying the brake. The microswitch MS4, as shown in FIG. 5, is mounted on a plate 176, the latter, in turn, being fixed by means of a pin 178 to the stem of the adjusting knob 172 on an axis coinciding with the axis of the cam shaft 156. By rotating the knob 172 the angular position of the microswitch MS4, in relation to the axis of the shaft 156, may be changed thus enabling an adjustment so that the microswitch MS4 will be opened early or late in rotation of the cam shaft. The position of the microswitch MS4 controls the length of time the clutch will be engaged with the shaft 160 and hence the length of paper drawn off. Following disengagement of the clutch from the shaft 160 and reengagement of the brake therewith, microswitch MS5 is opened by a cam on the cam shaft to terminate the cycle of operation. Opening this microswitch MS5 deenergizes relay K1 so that the motor stops.

Mechanically connected microswitches S2—S2 provide for jogging the control unit so as to permit positioning of the end of the strip preparatory to initiation of a cycle of operation.

As previously pointed out, instead of winding the exposed paper onto a roll, it may be cut up into suitable lengths by actuation of a cutter 60. An arm 180, fixed to the cam shaft, operates to actuate the cutter by engagement with a cam surface 182 at the upper end of the arm 66. A microswitch MS8 momentarily terminates the feed to permit cutting while the strip is stationary and a microswitch MS7 restores feeding following the cutting.

If desired, cycling of the apparatus may be initiated and terminated by actuation of the enlarger lamp 14. This is effected as herein diagrammatically shown in FIG. 10 by placing a toggle switch S9 in print position. Now, when the enlarger lamp is turned on an AC relay K3 is closed. Simultaneously, the circuit containing the start button switch S6 is opened and a DC relay K4 is closed. The relay K4 includes a time delay. At the end of the exposure, relay K3 is opened completing the circuit to the start button S6. Relay K4 will hold momentarily completing a circuit to relay K1, so as to initiate a cycle of operation of the machine. The cycling will be repeated each time the enlarger lamp is lighted.

The apparatus may be caused to cycle a predetermined number of times for the purpose of reproducing a plurality of prints of the same size and kind by employing a counter and counter circuit which may be present so as to count the number of times the enlarger is actuated and when a predetermined number is reached automatically to terminate such operation. FIG. 11 shows diagrammatically a counter C and its circuit. The counter is energized by start button S10 so that when the first cycle of operation is initiated by push button S6 (FIG. 9) the counter is simultaneously actuated. Upon completion of the first cycle, relay K5 automatically initiates a second cycle. This automatic operation is now continually repeated until the desired count is reached at which time relay K6 opens thereby concluding the operation.

As indicated heretofore, the print strip may be wound up in the form of a roll for processing and cutting in another apparatus into lengths determined by marks placed on the back side of the strip to enable automatic cutting by sensing means such a a photoelectric cell or the like. Accordingly, it is also contemplated that a marker may be included in this apparatus to make such marks on the back of the strip. The marker may, for example, be mounted in the housing 22 in a position to apply marks to the back of the strip and is actuated by the end of the feed switch S5 (FIG. 9) through normally open contacts. The actuation of the switch S5 also ends the motor cycle. A marker MK and circuit is disclosed diagrammatically in FIG. 12.

The apparatus, as thus described, provides a simple, compact and efficient piece of equipment for reproducing enlargements of the same or different size in quantity with a minimum handling of the sensitive paper, waste thereof and spoiling by exposure to light.

It should be understood that the present disclosure is for the purpose of illustration only and that this invention includes all modifications and equivalents which fall within the scope fo the appended claims.

I claim:

1. For use with an enlarger, a sensitive paper transport comprising a mobile base, a housing at each end of the base, that portion of the base between the housings constituting a flat supporting surface adapted to be placed in the focal plane of the enlarger, means in one of the housings supporting a roll of sensitive paper, means in the other housing for taking up the exposed paper, and means movable between the housings, parallel to the base, to conceal the entire area of the paper resting on the supporting surface until an exposure is to be made, said means being operative, according to the size of the exposure to be made, to expose only an area of such size.

2. For use with an enlarger, a sensitive paper transport comprising a mobile base, a light-tight housing at each end of the base, that portion of the base between the housings constituting a flat supporting surface adapted to be placed in the focal plane of the enlarger, means in one housing supporting a roll of sensitive paper, means in the other housing for taking up the exposed paper, guide means at the edges of the supporting surface between the housings, a light-tight curtain supported in the housing containing the sensitive paper for movement in a plane parallel to the supporting surface, with its edges confined by said guide means, into light-tight engagement with the housing containing the take-up means, means for holding the curtain stretched from one housing to the other preparatory to exposure of the paper, and means for constraining the curtain at a position intermediate the housings to expose a predetermined length of the paper.

3. For use with an enlarger, a sensitive paper transport comprising a mobile base, a light-tight housing at each end of the base, that portion of the base between the housings constituting a flat supporting surface adapted to be placed in the focal plane of the enlarger, means in one housing supporting sensitive paper, means in the other housing for taking up exposed paper, a curtain movable in a plane parallel to the supporting surface between the housings to conceal the entire length of the sensitive paper situated on said supporting surface between said housings prior to exposure, curtain guides at the edges of the supporting surface confining the edges of the curtain, paper guides beneath the curtain, one of which is fixed and the other of which is movable widthwise of the supporting surface, and means for holding the curtain at a position intermediate the housings, said curtain and movable guide being operable to expose an area of the paper of predetermined size.

4. For use with an enlarger, a sensitive paper transport comprising a mobile base, a light-tight housing at each end of the base, that portion of the base between the housings constituting a flat supporting surface adapted to be placed in the focal plane of the enlarger, means in one housing supporting sensitive paper, means in the other housing for taking up exposed paper, a roller curtain movable in a plane parallel to the supporting surface between the housings to conceal the entire length of the sensitive paper situated on said supporting surface between said housings prior to exposure, spaced parallel curtain guides at the edges of the supporting surface for receiving the edges of the curtain, a handle at the leading end of the curtain for drawing it from the roll in the housing containing the sensitive paper lengthwise of the supporting surface toward the housing in which the exposed paper is taken up, a magnet on said handle operable, by engagement with the latter housing, to hold the curtain stretched across the supporting surface, means for holding the curtain at a position intermediate the housings, and a paper guide movable widthwise of the supporting surface cooperable with the curtain to provide an opening of predetermined size.

5. For use with an enlarger, a sensitive paper transport comprising a mobile base, a light-tight housing at each end of the base, that portion of the base between the housings constituting a flat supporting surface adapted to be placed in the focal plane of the enlarger, means in one housing supporting sensitive paper, means in the other housing for taking up exposed paper, spaced parallel paper guides on the supporting surface for receiving the edges of the paper, one of said guides being adjustable widthwise of the support to a position relative to the other according to the width of the paper, spaced parallel curtain guides on the support outside of the paper guide for retaining the edges of a curtain, a curtain mounted on a roller in the housing containing the sensitive paper and movable therefrom lengthwise of the supporting surface into engagement with the housing containing the exposed paper to cover the entire length of paper resting on the supporting surface between the housings, said curtain having at its distal end a rigid bar, and an adjustable bar disposed transversely of the supporting surface, adjustable lengthwise thereof, operable to hold the curtain, by engagement of the bar at the distal end of the curtain therewith, at a predetermined position lengthwise of the supporting surface.

6. For use with an enlarger, a sensitive paper transport comprising a mobile base, a housing at each end of the base, that portion of the base between the housings constituting a flat supporting surface adapted to be placed in the focal plane of the enlarger, means for moving a sensitive paper from one housing to the other, lengthwise of the support, for exposure to an enlarger, and supporting feet on the base comprising studs containing at their lower ends balls on which the transport may be rolled to position it beneath the enlarger, elevating pins situated in the lower ends of the studs for supporting the transport off the balls, and means for adjustably projecting the pins from the feet to raise them off the balls to a position in which the plane of the support is at the focal distance of the enlarger.

7. For use with an enlarger, a sensitive paper transport comprising a mobile base, a housing at each end of the base, the portion of the base between the housings constituting a flat supporting surface adapted to be placed in the focal plane of the enlarger, means for moving a sensitive paper from one housing to the other for exposure to the enlarger, and supporting feet comprising studs, each of which contains a recess at its lower end in which is rotatably mounted a ball, and a hole in which is mounted a pin for movement heigthwise of the studs, and cam rods operable, by rotation against the tops of the pins, to project them from the studs sufficiently to raise the transport from the balls.

8. For use with an enlarger, a sensitive paper transport comprising a mobile base, a housing at each end of the base, the portion of the base between the housings constituting a flat supporting surface adapted to be placed in the focal plane of the enlarger, means for moving a sensitive paper from one housing to the other, and supporting feet comprising three studs, each of which contains at its lower end a recess containing a ball, a vertical hole in which there is slidably mounted a pin, a horizontal hole in which there is mounted a cam element, and a lever fixed to the cam element operative, by rotating the element, to lift the transport from the balls to the pins.

9. For use with an enlarger, a sensitive paper transport comprising a mobile base, a housing at each end of the base, the base between the housings constituting a flat supporting surface adapted to be placed in the focal plane of the enlarger, means for moving sensitive paper from one housing to the other along the support, a light-tight curtain disposed parallel to the supporting surface above the paper, indicia representing paper size on the exposed side of the curtain by means of which the enlarger may be focused while the curtain is extended lengthwise of the supporting surface, completely covering the paper resting thereon, and pre-adjustable means operable to raise the supporting surface an amount corresponding to the difference between the plane of the curtain and the plane of the paper.

10. In a paper transport, a paper support and a paper take-up, a shaft for effecting rotation of the paper take-up, an electrically operable clutch and brake assembly associated with the shaft, a motor operative to rotate the clutch, means operative to engage the clutch with the shaft and disengage the clutch from the shaft, and to disengage the brake from the shaft and engage the brake with the shaft, a cam shaft rotatable by the motor, and microswitches operative by the cams as the cam shaft rotates, comprising a first microswitch for effecting operation of said means operative to engage the clutch, a second microswitch operative at a predetermined interval following engagement of the clutch to effect operation of said means operative to disengage the clutch, and a third microswitch operative to terminate the cycle.

11. Apparatus according to claim 10, wherein the second microswitch is supported for angular movement about the axis of the cam shaft and there is means for adjusting the position of said second microswitch relative to said first and third microswitches.

12. In a paper transport, a paper support and paper take-up, a shaft for effecting rotation of the paper take-up, an electrically operable clutch and brake assembly associated with the shaft, a motor operative to rotate the clutch relative to said shaft, and means operative, in response to the operation of the motor, first to engage the clutch with the shaft, then disengage the clutch from the shaft following a predetermined interval of rotation, and finally to terminate operation of the motor.

13. A paper transport according to claim 12, comprising means operative to initiate a cycle of operation in the form of a starting switch for the motor.

14. In a paper transport, a paper support and a paper take-up, a shaft for effecting rotation of the paper take-up, power-operated means, first means operative to connect the shaft to said power-operated means for effecting rotation of the shaft, second means operative to disconnect the shaft from said power-operated means following a predetermined period of rotation, and third means operative to terminate operation of said power-operated means.

15. Apparatus according to claim 14, comprising means for initiating operation of said power-operated means.

16. Apparatus according to claim 14, comprising means for jogging the first means to position the strip preparatory to feeding.

17. In a paper transport, a paper support and paper take-up, a shaft for effecting rotation of the paper take-up, power-operated means, first means operative to connect the shaft to the power-operated means, second means operative to disconnect the shaft from said power-operated means, third means operative to terminate operation of said power-operated means, and means for adjusting said second operative means to disconnect the shaft at different intervals of rotation thereof.

18. For use with an enlarger, a sensitive paper transport comprising a mobile base, a housing at each end of the base, the portion of the base between the housings constituting a flat supporting surface adapted to be placed in the focal plane of the enlarger, means for moving a sensitive paper from one housing to the other lengthwise of the support, paper guides at the edge of the supporting surface, each of which has an undercut, inwardly projecting flange for receiving an edge of the paper, a curtain movable lengthwise of the supporting surface in a plane above and parallel to the paper, curtain guides at the edges of the supporting surface, each of which has an undercut, inwardly projecting flange for receiving an edge of the curtain, a bar at the leading end of the curtain, said curtain guides having outwardly projecting flanges, a bar disposed transversely of the curtain guides with its ends slidably engaged with the outwardly projecting flanges, and screws at the ends of the latter bar operative to fix said bar at any selected position lengthwise of the guides, said bars being operative, by engagement, to hold the curtain at a predetermined position lengthwise of the supporting surface.

19. For use with an enlarger, a sensitive paper transport comprising a base, a housing at each end of the base, the portion of the base between the housings constituting a flat supporting surface adapted to be placed in the focal plane of the enlarger, feed rolls for moving the sensitive paper from one housing to the other, a spool in the housing for winding the paper in strip form, and a slip drive operative to rotate the spool to take up the paper as it is drawn into the housing by said feed rolls without shifting the paper bodily relative to the bight of the feed rolls.

20. For use with an enlarger, a sensitive paper transport comprising a base, a housing at each end of the base, the portion of the base between the housings constituting a flat supporting surface adapted to be placed in the focal plane of the enlarger, feed rolls for moving the sensitive paper from one housing to the other, a spool in the housing for winding the paper in strip form, and means for rotating the spool comprising a pair of spaced pulleys, one of which is connected to the spool and the other of which is driven, and a belt loosely entrained about said pulleys so as to effect rotation of the spool to take up the slack between the spool and the nip of the feed rolls without pulling the paper relative to the bight of the feed rolls.

21. Strip feeding means comprising a feed roll, means yieldably holding the strip material to be advanced thereby in tangential engagement with the feed roll, a shaft supporting the feed roll for rotation, a motor for driving the shaft, a combination power-operable clutch and brake assembly operable, on the one hand, simultaneously to connect the motor to the shaft and release the brake from the shaft to effect feeding and, on the other hand, to disconnect the motor from the shaft and apply the brake to stop feeding, means for effecting operation of said power-operable means successively to initiate and stop feeding, and means for adjusting the interval between said successive operations.

22. Strip feeding means according to claim 21, wherein said last means comprise first and second switch means consecutively operable by rotation of the shaft, and means for adjusting the switch means relative to each other.

23. In a strip-feeding machine, a feed roll against which the strip is yieldably held, a shaft supporting the feed roll for rotation, a motor, means operable, on the one hand, to connect the motor to the shaft to effect rotation thereof and, on the other hand, to disconnect the motor from the shaft to terminate rotation, a program shaft rotatable by the motor, and switch means associated with the program shaft operable thereby, following initiation of operation of the motor, to effect operation of the first means to disconnect the motor from the shaft.

24. A machine according to claim 23, wherein said first means is a clutch-brake assembly operable, on the one hand, by deenergization of the brake and energization of the clutch to rotate the drive shaft and, on the other hand, by deenergization of the clutch and energization of the brake to stop rotation of the drive shaft.

25. A machine according to claim 24, wherein there is a first switch operable to de-energize the brake and energize the clutch, and a second switch operable to de-energize the clutch and energize the brake.

26. A machine according to claim 25, wherein there is means for adjusting the second switch relative to the first switch.

27. A machine according to claim 24, wherein there is a starting switch for initiating operation of the motor and a stopping switch for terminating operation of the motor when the program shaft has turned one revolution.

References Cited
UNITED STATES PATENTS

| | | | |
|---|---|---|---|
| 2,574,392 | 11/1951 | Huebner | 88—24 |
| 2,616,331 | 11/1952 | Pavelle | 88—24 |
| 2,896,505 | 7/1959 | Nations. | |
| 3,139,791 | 7/1964 | Bailey et al. | 88—24 |

NORTON ANSHER, *Primary Examiner.*

R. A. WINTERCORN, *Assistant Examiner.*